United States Patent
Karasaridis

(10) Patent No.: US 8,499,034 B2
(45) Date of Patent: Jul. 30, 2013

(54) METHODS AND APPARATUS TO TRANSMIT A REQUEST TO SERVER VIA DOMAIN SYSTEM FORWARDING

(75) Inventor: Anestis Karasaridis, Oceanport, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 386 days.

(21) Appl. No.: 12/840,669

(22) Filed: Jul. 21, 2010

(65) Prior Publication Data

US 2012/0023153 A1      Jan. 26, 2012

(51) Int. Cl.
*G06F 15/16*      (2006.01)

(52) U.S. Cl.
USPC .......................... 709/203; 709/219; 709/221

(58) Field of Classification Search
USPC .................. 709/203, 217, 238, 242, 219, 221
See application file for complete search history.

(56) References Cited

U.S. PATENT DOCUMENTS

| | | | |
|---|---|---|---|
| 6,968,389 B1 * | 11/2005 | Menditto et al. ............. | 709/233 |
| 6,976,090 B2 | 12/2005 | Ben-Shaul et al. | |
| 7,032,010 B1 | 4/2006 | Swildens et al. | |
| 7,062,562 B1 | 6/2006 | Baker et al. | |
| 7,308,475 B1 | 12/2007 | Pruitt et al. | |
| 7,617,274 B2 | 11/2009 | Coughlin et al. | |
| 2003/0058813 A1 * | 3/2003 | Viola et al. ..................... | 370/328 |
| 2003/0069016 A1 * | 4/2003 | Bahl et al. ..................... | 455/432 |
| 2003/0093523 A1 | 5/2003 | Cranor et al. | |
| 2004/0249971 A1 * | 12/2004 | Klinker ......................... | 709/239 |
| 2005/0021614 A1 * | 1/2005 | Bahlmann ..................... | 709/203 |
| 2005/0036501 A1 * | 2/2005 | Chung et al. .................. | 370/401 |
| 2006/0184640 A1 | 8/2006 | Hatch | |
| 2006/0253609 A1 | 11/2006 | Andreev et al. | |
| 2008/0086574 A1 | 4/2008 | Raciborski et al. | |
| 2008/0304427 A1 * | 12/2008 | Biswas et al. ................. | 370/255 |

OTHER PUBLICATIONS

Cohen et al., "Proactive caching of DNS records: addressing a performance bottleneck," Applications and the Internet, 2001. Proceedings. 2001 Symposium on , vol., no., pp. 85,94, 2001.*

* cited by examiner

*Primary Examiner* — Wing F Chan
*Assistant Examiner* — Kostas Katsikis
(74) *Attorney, Agent, or Firm* — Hanley, Flight & Zimmerman, LLC

(57) ABSTRACT

Disclosed example methods include receiving in a gateway a request to connect to a domain name from a client coupled to the gateway, selecting a first domain name system server corresponding to the domain name based on a rule linking the first domain name system server to the domain name, adding location information to the request in the gateway, the location information to be used by the first domain name system server to select a second domain name system server associated with the domain name, and transmitting the request including the location information to the selected first domain name system server.

17 Claims, 8 Drawing Sheets

METHODS AND APPARATUS TO TRANSMIT A REQUEST TO SERVER VIA DOMAIN SYSTEM FORWARDING

FIELD OF THE DISCLOSURE

This disclosure relates generally to domain name system servers and, more particularly, to methods and apparatus to transmit a request to a server via domain name system forwarding.

BACKGROUND

To connect clients to content stored on a server accessible via the Internet, regional domain name system (DNS) servers translate domain names requested by clients to corresponding Internet Protocol (IP) addresses. The regional DNS servers then forward the client requests to edge or authoritative DNS servers that are associated with the requested domain names. The authoritative DNS servers store IP addresses of content servers. Upon receiving a request, the authoritative DNS servers transmit a reply with IP addresses of content servers associated with the requested content. Once a client has an IP address of a content server, the client may communicatively couple to the content server to access the desired content.

Content providers are increasing the number of content servers to accommodate an increase in client traffic from cloud computing, movie and music downloading, media streaming, social media networking, and Internet browsing. Additionally, mobile computing clients such as, for example, smartphones, e-readers, netbooks, and smartpads are increasingly enabling users across the globe to connect to the Internet from any location. To accommodate this increase in Internet usage, content providers are adding content servers and distributing these servers across different geographic locations.

DETAILED DESCRIPTION

Figure 1:
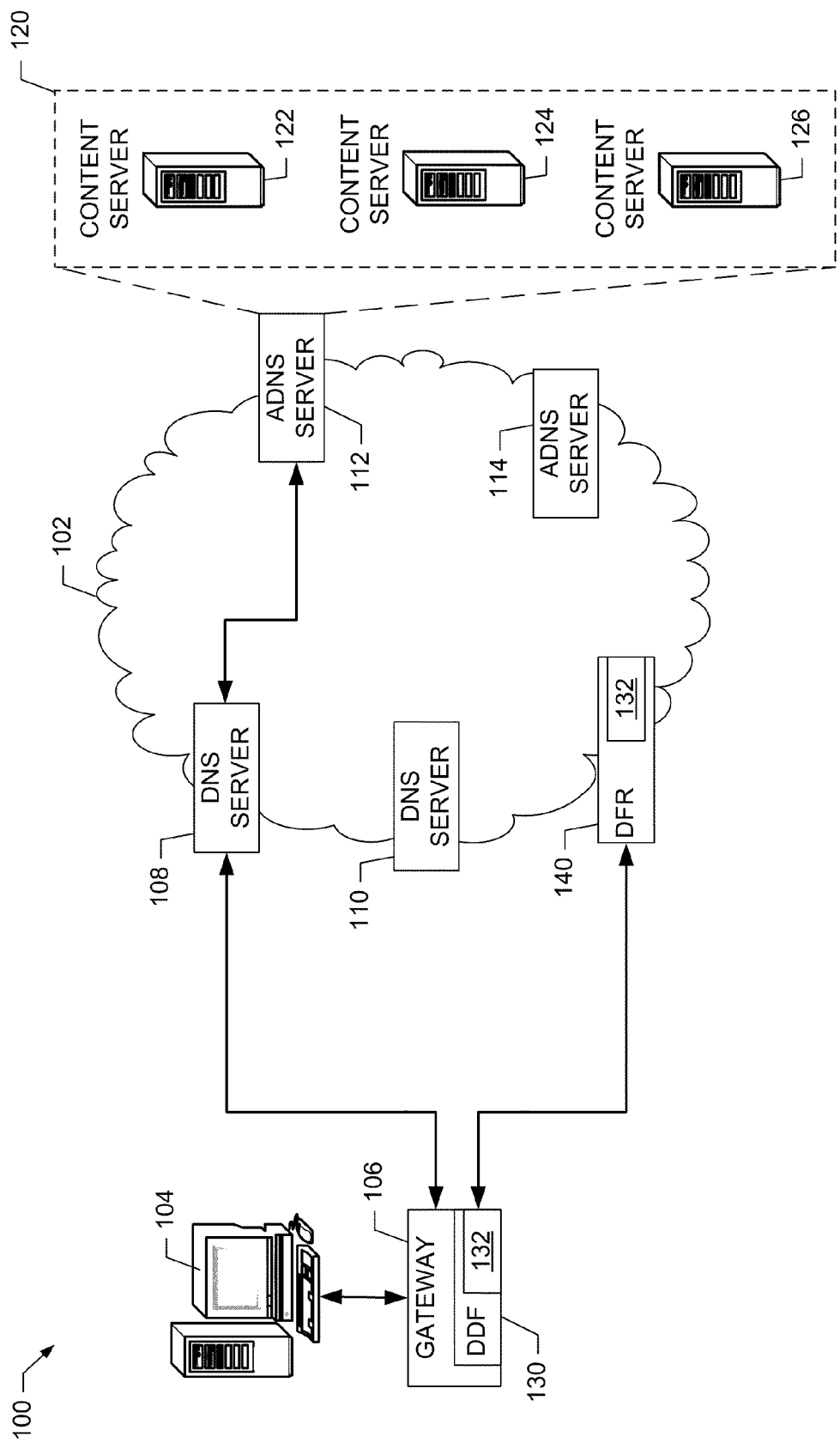
FIG. 1 is a schematic illustration of an example communication system including a dynamic domain name system forwarder included within a gateway coupled to a client.

Example methods, articles of manufacture, and apparatus to transmit a request to a server via domain name system forwarding are disclosed. A disclosed example method includes receiving in a gateway a request to connect to a domain name from a client coupled to the gateway and selecting a first domain name system server corresponding to the domain name based on a rule linking the first domain name system server to the domain name. The example method also includes adding location information to the request in the gateway, the location information to be used by the first domain name system server to select a second domain name system server associated with the domain name and transmitting the request including the location information to the selected first domain name system server.

A disclosed example apparatus includes a request processor to select a first domain name system server corresponding to a requested domain name based on a rule linking the first domain name system server to the domain name. The request processor is to also add location information to the request, wherein the location information is transmitted to a second domain name system server via the first domain name system server and is to be used by the second domain name system server to select a content server associated with the domain name.

A client is a computing device that is capable of accessing the Internet via a wired and/or a wireless connection. A client may include a personal computer, a laptop, a workstation, a netbook, a smartpad, a smartphone, and/or any other device with a processor that may communicate with a server via the Internet. To access the Internet, a client includes an interface (e.g., a gateway). In some examples, the gateway may be internal to the client (e.g., a wireless Internet card within a laptop). In other examples, the gateway may be external and communicatively coupled to the client (e.g., a residential class router coupled to a personal computer).

Typically, a user types, clicks, and/or enters a Uniform Resource Locator (URL) (e.g., website address) into a client to request access to content servers associated with the URL. For example, a user may enter or select an 'att.com/olam/loginAction.olamexecute?goto=welcome' URL to access content stored on content servers managed by AT&T. To resolve the URL, regional DNS servers translate (e.g., resolve) a domain name (e.g., 'att.com') of the requested URL into a corresponding Internet Protocol (IP) address. In many known systems, clients are configured to transmit requests to a single regional DNS server determined by an Internet Service Provider (ISP). In this manner, substantially all requests transmitted by a client are sent to the same regional DNS server. A regional DNS server that receives a domain name request has to forward the request to authoritative DNS (ADNS) servers until an ADNS server is located with an IP address associated with the requested domain name. An ADNS server is a gateway to a domain of content servers managed by a content provider.

In many known systems, ADNS servers maintain a list of IP addresses of content servers within the same domain. In some instances, each of the content servers may host different content. In other instances, the content servers may share at least some content. Upon receiving a request to connect to content, the ADNS servers determine which of the content servers includes the requested content and return the IP address of that content server to the client. Upon receiving an IP address of a content server, a client establishes a connection to the content server to access the requested content.

In some known systems, ADNS servers determine a content server to connect to a client based on available capacity of content servers, available bandwidth of content servers, and/or based on which content servers are relatively communicatively and/or physically closer to the regional DNS server(s) that forwarded the request. For example, ADNS servers identify which regional DNS server transmitted a request based on an IP address of the regional DNS server included within the request and/or based on which path the request was received by the ADNS server. The ADNS server uses the identity of the regional DNS server to select a content server relatively close to the regional DNS server. However, the physical location of the client may not correspond to the physical location of the selected regional DNS server. This may be especially true when a client domain name request is forwarded to multiple regional DNS servers. As a result of the physical location difference between the client and the regional DNS server, the content server assigned to the client may not actually be relatively close to the client and/or may not be the most efficient content server for the client.

The example methods, apparatus, and article of manufacture described herein utilize a forwarding rule set stored within a gateway of a client to select a regional DNS server that corresponds to a domain name requested by a client The selection of a regional DNS server based on a client specified domain name may be referred to as dynamic DNS forwarding. The domain name request is a request message that conforms to Internet message transmission protocols to connect a client to a content server associated with the domain name specified within the request.

The example methods, apparatus, and article of manufacture also add location information associated with the client to the domain name request that is transmitted to the regional DNS server. The location information includes an IP address assigned to the client, a network location of the client, and/or a geographic location of the client. The regional DNS server uses the location information to select an ADNS server (e.g., the physically closest ADNS server) associated with the requested domain name. Because the request from the client is transmitted to the regional DNS server corresponding to a requested domain name (e.g., operated and/or managed by a content provider associated with the requested domain name), the request does not have to be forwarded among regional DNS servers until the appropriate regional DNS server is located. Additionally, transmitting a client domain name request to a corresponding regional DNS server enables a content provider associated with the domain name to provide advertising, marketing and/or other network-based services via the regional DNS server.

Further, because the ADNS server has the network and/or geographic location of the client via the domain name request, the example methods, apparatus, and articles of manufacture described herein enable the ADNS server to select a content server that is relatively more efficient for the client to access. For example, the ADNS server may select the content server that is relatively communicatively and/or physically closer to the client than other content servers and/or the content server that has available capacity or bandwidth to connect to the client. In this manner, the methods, apparatus, and articles of manufacture described herein enable an ADNS server to select a content server based on location information associated with a client rather than location information associated with a regional DNS server.

In the interest of brevity and clarity, throughout the following disclosure, reference will be made to an example communication system 100 of FIG. 1. However, the methods, articles of manufacture, and apparatus described herein to transmit a request to a server via domain name system forwarding are applicable to other types of networks constructed using other network technologies, topologies and/or protocols.

FIG. 1 illustrates the example communication system 100 that includes a switching network 102 (e.g., the Internet). The example switching network 102 may include any type of network for routing packet-based communications (e.g., data) between clients, network components, and content servers. For example, the switching network 102 may include any Wide Are Network (WAN), wireless WAN, multiprotocol label switching (MPLS), and/or any other switching network.

The communication system 100 of the illustrated example includes a client 104 communicatively coupled to a gateway 106 via any wired and/or wireless connection. The example client 104 is shown in FIG. 1 as a personal computer. In other examples, the client 104 may include a laptop, a smartphone, a smartpad, a netbook, a personal digital assistant (PDA), and/or any other computing device capable of coupling to the switching network 102. The client 104 displays content to a user via a web browsing application (e.g., an Internet browser).

The example gateway 106 connects the client 104 to the switching network 102 and may include an IP router, a multiport Ethernet switch, a cable modem, a digital subscriber line (DSL) modem, a satellite modem, a firewall, and/or a wireless access point. In some examples, the gateway 106 performs network address translation (NAT) to enable more than one client 104 to connect to the switching network 102 using a single IP address.

The example communication system 100 of FIG. 1 includes regional DNS servers 108 and 110. The regional DNS servers 108 and 110 receive requests to resolve domain names from clients (e.g., the client 104) and translate and/or resolve the domain names into corresponding IP addresses. In some examples, the regional DNS servers 108 and 110 receive and cache an IP address of a content server. In these examples, the regional DNS servers 108 and 110 receive the IP address via prior domain name resolutions. If a requested domain name corresponds to this IP address, the regional DNS servers 108 and 110 returns the IP address of the content server to the client 104 via the gateway 106. However, if the regional DNS servers 108 and 110 do not include an IP address that corresponds to the requested domain name, the regional DNS servers 108 and 110 identify an ADNS server that is authoritatively responsible for resolving the domain name. The regional DNS servers 108 and 110 forward the request to the identified ADNS server.

In the example of FIG. 1, the communication system 100 also includes ADNS servers 112 and 114. Each of the ADNS servers 112 and 114 may be associated with a domain. For example, in FIG. 1, the ADNS server 112 is associated with a domain 120 that includes content servers 122, 124, and 126. The ADNS server 114 is associated with a different domain and content server(s) (not shown). In this manner, the ADNS servers 112 and 114 are gateways to their respective domains (e.g., the domain 120) by storing a list of IP addresses of content servers (e.g., the content servers 122-126) within the domain (e.g., the domain 120). The ADNS servers 112 and 114 use the lists to determine which of the content servers is to be connected to a client (e.g., the client 104).

The content servers 122-126 of the illustrated example include content accessible to the client 104. The content may include media, movie files, music files, applications, social media networks, account information, cloud computing-based applications, and/or any other content that may be available to the client 104 via the switching network 102. While the content servers 122-126 are included within the same domain 120, the content servers 122-126 may be located at physically different locations. For example, the content server 122 may be located in New York City, the content server 124 may be located in San Jose, and the content server 126 may be located in Frankfurt, Germany.

In some examples, the content servers 122-126 may include substantially the same content. In these examples, the ADNS server 112 selects the available content server 122-126 within the domain 120. In other examples, the content servers 122-126 may include different content and/or different types of content associated with the domain 120. In these examples, the ADNS server 112 selects the content server 122-126 with the requested content.

Upon selecting the content server 122-126, the ADNS server 112 returns the IP address of the content server 122-126 to the requesting client 104 via the regional DNS server 108. The client 104 then uses the IP address to access the content on the content server 122-126 via the switching network 102. In this manner, the regional DNS servers 108 and 110 and the ADNS servers 112 and 114 establish a connection between the client 104 and the content server 122-126 within the domain 120 requested by the client 104.

In the illustrated example of FIG. 1, the example gateway 106 includes a dynamic DNS forwarder (DDF) 130 to determine to which of the regional DNS servers 108 and 110 to transmit requests (e.g., domain name requests) from the client 104. The example DDF 130 may also add location information to the request that may be used by the regional DNS server 108 to select the ADNS server 112 and used by the ADNS server 112 to select one of the content servers 122-126. For example, if the client 104 provides the 'att.com' domain name, the DDF 130 accesses a forwarding rule set 132 and determines that the regional DNS server 108 corresponds (e.g., cross-references) to and/or is hosted by the 'att.com' domain. The DDF 130 may use, for example, the Anycast addressing and routing routine to select the closest regional DNS server 108. Further, the regional DNS server 108 may use the Anycast routine to select the closest ADNS server 112. In other examples, the forwarding rule set 132 may provide more than one regional DNS server to forward the request if multiple regional DNS servers (e.g., the regional DNS servers 108 and 110) are associated with the requested domain 120. In these examples, the DDF 130 may select a regional DNS server that is communicatively and/or physically closer than other regional DNS servers and which has available capacity. A communicatively closer regional DNS server includes a regional DNS server that has a shorter network connection distance and/or a relatively shorter transmission latency to the DDF 130.

The example DDF 130 of FIG. 1 may also add the network and/or geographic location of the client 104 to the request and transmit the request for the 'att.com' domain to the regional DNS server 108. In contrast, in many known systems the gateway 106 may be configured to transmit all requests to the regional DNS server 110. In these known systems, the regional DNS server 110 may have to query ADNS servers until an IP address of a domain name is located if the server 110 does not include the IP address of the domain name.

In the illustrated example of FIG. 1, by having the forwarding rule set 132 specify the appropriate regional DNS server 108 based on a requested domain, the example DDF 130 ensures a request is sent only to the regional DNS server specified by the forwarding rule set 132 based on the requested domain 120. The example DDF 130 receives and/or updates the forwarding rule set 132 by accessing a dynamic forwarding rule (DFR) server 140. The DFR server 140 includes, is associated with, and/or is communicatively coupled to a dynamic host configuration protocol (DHCP) server. In the illustrated example, a DHCP server is included within the DFR server 140. The example DFR server 140, via the DHCP server, maintains an assignment of IP addresses to clients, including the example gateway 106. When the gateway 106 transmits a lease renewal for an IP address, the example DDF 130 includes within the lease renewal message a request for the forwarding rule set 132.

The example DFR server 140 returns the newly leased IP address to the gateway 106 in addition to the forwarding rule set 132. The forwarding rule set 132 specifies to which of the regional DNS servers 108 and 110 a domain name request is to be forwarded by the DDF 130 based on the particular domain name. In some examples, an ISP of the DFR server 140 periodically updates the forwarding rule set 132 based on changing conditions of the switching network 102. In other examples, the ISP may update the forwarding rule set 132 as domains (e.g., the domain 120) are configured in relation to regional DNS servers 108 and 110. In yet other examples, the ISP may update the forwarding rule set 132 based on which regional DNS servers are hosted by which service providers.

In the illustrated example of FIG. 1, the regional DNS server 108 receives a domain request from the gateway 106 with the location of the client 104 and locates the ADNS server 112 associated with the requested domain 120. Additionally, in some examples where the DDF 130 does not include the network and/or geographic location of the client 104 within the request, the regional DNS server 108 adds the network and/or geographic location to the request by identifying a source IP address associated within the gateway 106 within the request and performing a geographic-IP address lookup to determine an approximate location of the client 104.

In other examples, the domain 120 may be associated with more than one ADNS server (e.g., the ADNS servers 112 and 114). In these examples, the regional DNS server 108 uses the network and/or geographic location information included within the request to select the physically closest ADNS server. Alternatively, the regional DNS server 108 may select the ADNS server with available capacity. In the example of FIG. 1, the regional DNS server 108 selects the ADNS server 112. Upon selecting the ADNS server 112, the regional DNS server 108 forwards the domain name request including the network and/or geographic location of the client 104 to the ADNS server 112.

The example ADNS server 112 uses the location of the client 104 included within the domain request to select the content server 122-126. Because the ADNS server 112 has the location of the client 104, the ADNS server 112 can select the content server(s) 122-126 that includes content requested by the client 104 and which is relatively closer to the client 104 than other content server(s) 122-126 within the domain 120. Additionally or alternatively, the ADNS server 112 may use the network and/or geographic location to select the content server 122-126 with available bandwidth and/or capacity to host the request by the client 104. The ADNS server 112 then returns the IP address of the selected content server(s) 122-126 to the client 104.

Figure 2:
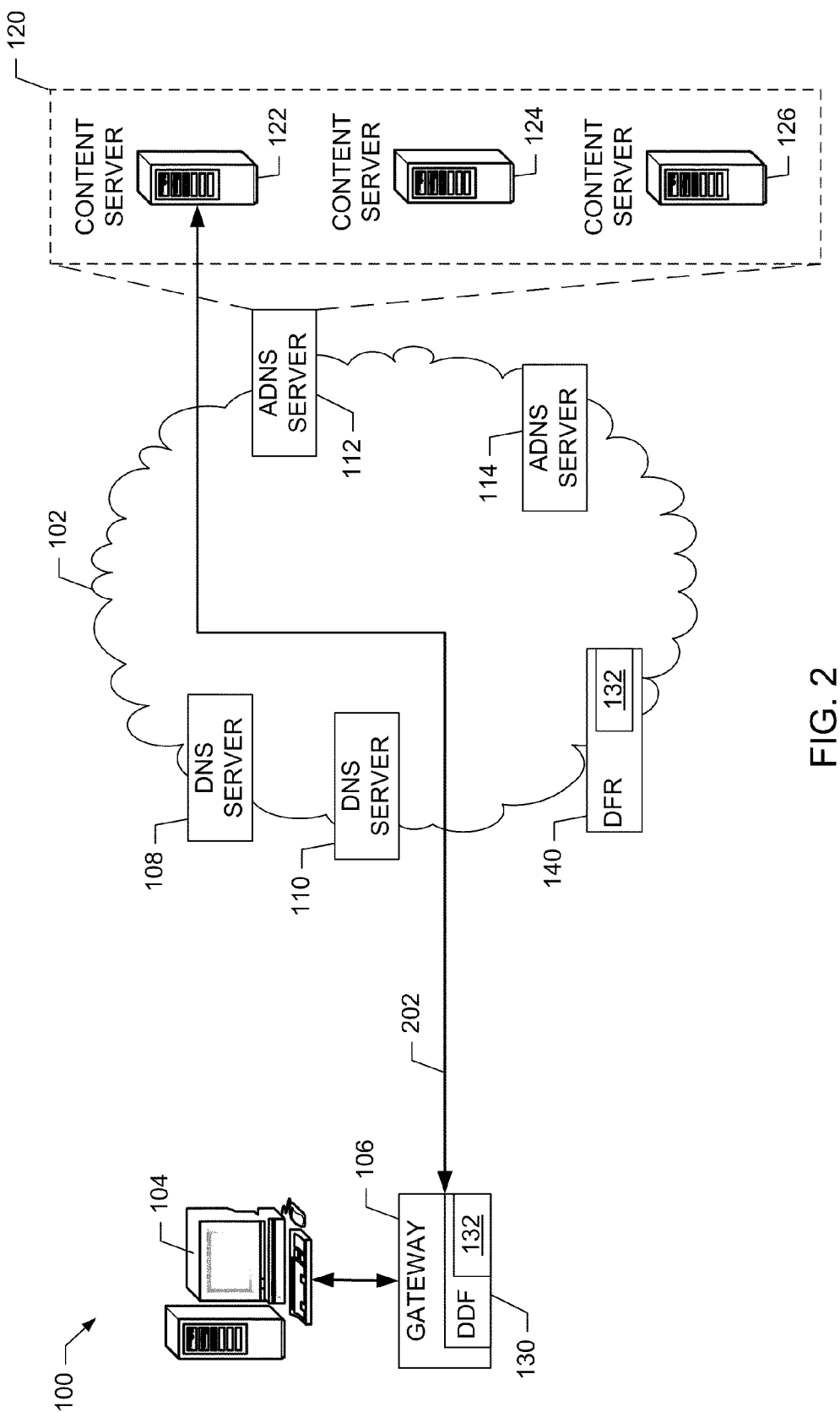
FIG. 2 shows the example communication system of FIG. 1 with the client communicatively coupled to a content server.

FIG. 2 shows the example communication system 100 of FIG. 1 with a communication link 202 between the content server 122 and the gateway 106. In the illustrated example, the client 104 establishes the communication link 202 via the gateway 106 to the content server 122 upon receiving the IP address of the content server 122 from the ADNS server 112. The client 104 establishes the communication link 202 by transmitting request to connect messages to the content server 122. Routers and/or switches (not shown) within the switching network 102 forward the connect messages to the content server 122 using the IP address of the content server 122 included within the messages. In some examples, the communication link 202 can be partitioned among multiple routers in parallel paths and reconstructed at the content server 122 and/or the gateway 106.

The example client 104 accesses content associated with the domain 120 hosted by the content server 122 via the communication link 202. For example, the client 104 may access media, files, data, and/or account access from the content server 122. The communication link 202 is terminated by the client 104 requesting to access a different domain and/or by the client 104 requesting to access content that is not included within the content server 122. The communication link 202 may also be terminated by a user exiting a web browsing application on the client 104 that is accessing content on the content server 122.

Figure 3:
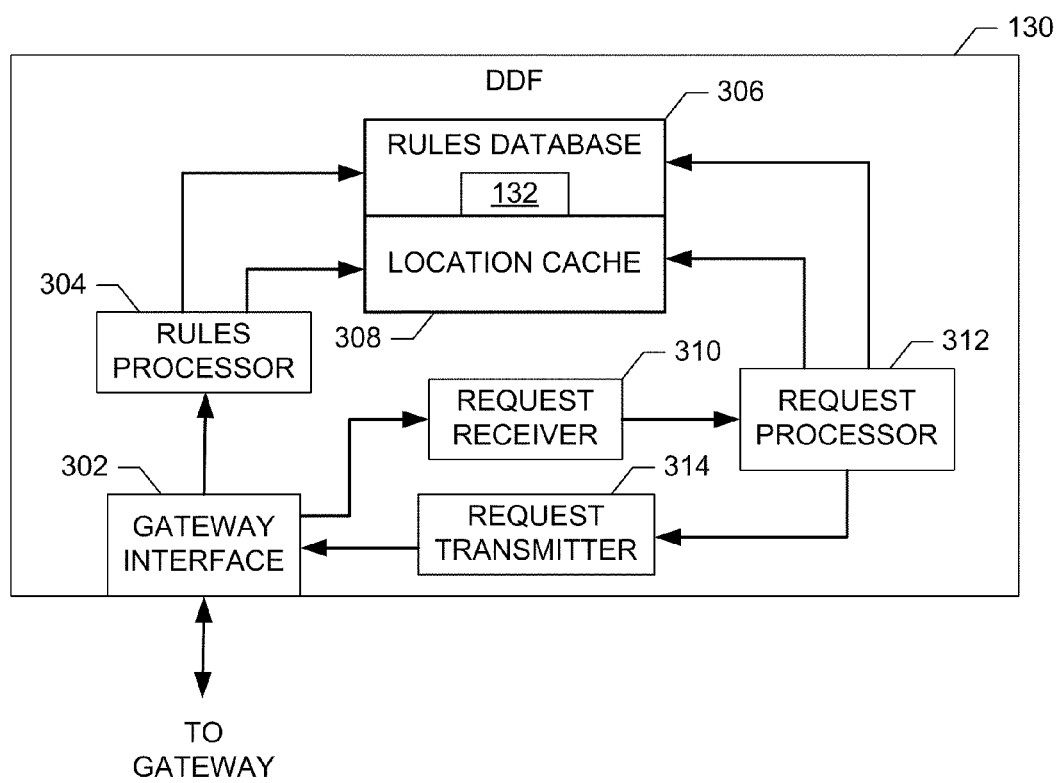
FIG. 3 shows a functional block diagram of the example dynamic domain name system forwarder of FIGS. 1 and 2.

FIG. 3 shows a functional block diagram of the example DDF 130 of FIGS. 1 and 2. The example DDF 130 is included within the example gateway 106 of FIGS. 1 and 2. In other examples, the DDF 130 may be external to and communicatively coupled to the gateway 106. To interface with the gateway 106, the DDF 130 includes a gateway interface 302. The example gateway interface 302 enables the DDF 130 to transmit and/or receive instructions from the gateway 106. For example, the DDF 130 receives requests for domain names from the client 104 via the gateway interface 302. In other examples, the DDF 130 may transmit the request for a domain name to the regional DNS server 108 via the gateway interface 302. The example gateway interface 302 is also utilized for storing the forwarding rule set 132 and location information to the DDF 130.

To manage forwarding rule sets and location information, the example DDF 130 includes a rules processor 304. The example rules processor 304 stores received forwarding rule sets (e.g., the forwarding rule set 132) in a rules database 306 and stores location information to a location cache 308. The location information includes a geographic or physical location of the client 104 including, for example, a street address, a latitude, a longitude, a city, a region, and/or a state. The location information also includes a network and/or an electronic address associated with the client 104 including, for example, an IP address assigned to the gateway 106 and/or a media access control (MAC) address of the client 104.

The location information is provided by a user entering location information via the client 104. In other examples, a service provider may transmit the location information based on account information provided by a user of the client 104 and/or based on an assigned IP address. For example, during DHCP lease renewals of IP addresses, a DHCP associated with the DFR server 140 server assigns an IP address to the gateway 106. When the gateway 106 receives the IP address, the gateway 106 forwards the IP address to the rules processor 304 for storage in the location cache 308. Additionally, a service provider may send location information associated with the client 104 to the rules processor 304 via the switching network 102.

To receive an IP address, the gateway 106 generates and transmits a lease renewal request for an IP address to a DHCP server associated with the DFR server 140. In these examples, the DHCP server associated with the DDF 130 manages the assignment of IP addresses to the gateway 106. To conform to DHCP protocol, the gateway 106 periodically transmits lease renewal requests to obtain a different IP address and/or to renew a currently assigned IP address. Upon receiving a request for a renewed IP address, the DHCP server transmits a message including the IP address assigned to the gateway 106. The gateway 106 receives the message and stores the newly assigned IP address to the location cache 308. In these examples, the gateway 106 may request the IP address from the DDF 130 for communications to the switched network 102. In other examples, the gateway 106 may also store a copy of the IP address so that the gateway 106 does not need to access the DDF 130 to transmit packet-based communications to the switching network 102.

The example rules processor 304 may use IP address renewals to obtain an updated version of the forwarding rule set 132 from the DFR server 140. For example, the rules processor 304 may receive a trigger indicating the gateway 106 is performing an IP lease renewal request. In response to the trigger, the rules processor 304 transmits a request to receive the forwarding rule set 132 from the DFR server 140. In other examples, the rules processor 304 may transmit the request for the forwarding rule set 132 separately from an IP address renewal request. For example, the rules processor 304 may request the forwarding rule set 132 from the DFR server 140 at periodic time intervals. In other examples, the DFR server 140 may send the rules processor 304 a notification that the forwarding rule set 132 had changed. In response, the rules processor 304 may transmit the request for the forwarding rule set 132.

The DFR server 140 maintains the forwarding rule set 132 based on updates from service providers, content providers, routers within the switching network 102, and/or any other administrator associated with the switching network 102. The forwarding rule set 132 includes a list of domain names and IP addresses of regional DNS servers (e.g., the regional DNS servers 108 and 110) that correspond to each of the domain names. Further, the forwarding rule set 132 is localized for each network and/or geographic area and/or client (e.g., the client 104). For example, the forwarding rule set 132 associates the regional DNS server 108 with the 'att.com' domain name for the client 104. For a different client at a different location, the forwarding rule set 132 may associate a different regional DNS server with the 'att.com' domain name. In this manner, the regional DNS servers are selected for domain names that reduce transmission time from a client gateway to a regional DNS server.

The example rules processor 304 of FIG. 3 updates the rules database 306 with the forwarding rules set 132. In some instances, the rules processor 304 updates the rules database 306 with a difference between the currently stored forwarding rule set 132 and the newly received forwarding rule set 132. Further, the rules processor 304 updates the rules database 306 periodically during IP address lease renewals. In some examples, the rules processor 304 may also update the rules database 306 upon receiving the forwarding rule set 132 separate from an IP address lease renewal. The rules database 306 and/or the location cache 308 may be implemented by, for example, a hard disk drive, a flash memory, a read-only memory (ROM), a compact disk (CD), a digital versatile disk (DVD), a cache, a random-access memory (RAM) and/or any other storage media in which information is stored for any duration.

To manage the receipt of domain name requests from the client 104, the example DDF 130 of the illustrated example includes a request receiver 310. The example request receiver 310 receives domain name requests from the gateway interface 302. The example request receiver 310 queues these requests until a request processor 312 can process the request. In some examples, the request receiver 310 queues these requests from multiple clients coupled to the gateway 106. Further, the example request receiver 310 may receive a request to connect to a domain when the client 104 physically moves to a different network and/or geographic area (e.g., a mobile client 104). In these examples, the DDF 130 transmits a domain name request to determine if the client 104 should be coupled to a closer content server.

To select a regional DNS server (e.g., the regional DNS server 108) to transmit the domain name request, the example DDF 130 includes the request processor 312. Upon receiving a request for a domain name, the request processor 312 accesses the forwarding rule set 132 within the rules database 306 and determines to which regional DNS server the request is to be forwarded. The request processor 312 matches the domain name requested with a corresponding IP address of a regional DNS server. In some examples, the domain name may be linked to one or more regional DNS servers within the forwarding rule set 132. The linkage of a domain name to a regional DNS server is a rule within the forwarding rule set 132. In other examples, the forwarding rule set 132 may link one or more ADNS servers to a domain name. In these other examples, a server provider may determine that it would be more efficient for the DDF 130 to forward the domain name request directly to an ADNS server and bypass any regional DNS servers.

In the illustrated example of FIG. 3, upon determining one or more IP addresses of regional DNS servers corresponding to a domain name request, the example request processor 312 adds a selected IP address to a destination field within the request. For example, in FIG. 1 the request processor 312 adds the IP address of the regional DNS server 108 to the 'att.com' domain name request. In some examples where the forwarding rule set 132 provides more than one IP address for regional DNS servers, the request processor 312 selects the communicatively and/or physically closer (e.g., closest) regional DNS server. Additionally or alternatively, the request processor 312 may also select the regional DNS server that has capacity to process the request. By selecting the appropriate regional DNS server associated with the domain name, the request processor 312 causes a domain name request to be forwarded to the closest regional DNS server associated with the request domain name prior to reaching an ADNS server associated with the requested domain name.

In addition to selecting a regional DNS server, the example request processor 312 also adds location information to the request. To add the location information, the example request processor 312 accesses the location cache 308. The request processor 312 then adds the location information to a field within the domain name request. For example, an IP address assigned to the gateway 106 and/or a MAC address of the client 104 may be added to a source field within the request. In another example, location information (e.g., a street address of the client 104) may be added by the request processor 312 to a location field of the request. Alternatively, the request processor 312 may use the IP address of the gateway 106 to perform a geographic-IP address lookup to determine an approximate location of the client 104.

By providing the location information within the domain name request message, a regional DNS server may use this information to select an ADNS server that is communicatively and/or physically closer to the client 104 than other ADNS servers. Further, the ADNS server may use the location information to select a content server that is closer to the client 104 than other content servers within the same domain. In this manner, the request processor 312 enables the ADNS server 112 of FIG. 1 to select the closest content sever 122 to the client 104, thereby reducing data propagation time, traffic bottlenecks, and/or switching network 102 linkage issues than if the client 104 was coupled to a relatively farther content server.

To transmit the domain request to a selected regional DNS server, the example DDF 130 of FIG. 3 includes a request transmitter 314. The example request transmitter 314 receives a domain name request including location information from the request processor 312 and transmits the request to the selected regional DNS server. To transmit the request, the request processor 312 uses a destination IP address included within the request. The request transmitter 314 transmits a request to the gateway interface 302, which then forwards the request to an outgoing channel on the gateway 106 to the selected DNS server via the switching network 102. In instances where the gateway 106 is transmitting data from the client 104, the request transmitter 314 may temporarily delay transmitting the request until the gateway 106 is available.

While an example manner of implementing the DDF 130 of FIGS. 1 and 2 has been illustrated in FIG. 3, one or more of the elements, processes and/or devices illustrated in FIG. 3 may be combined, divided, re-arranged, omitted, eliminated and/or implemented in any other way. Further, the example gateway interface 302, the example rules processor 304, the example rules database 306, the example location cache 308, the example request receiver 310, the example request processor 312, the example request transmitter 314 and/or, more generally, the example DDF 130 of FIG. 3 may be implemented by hardware, software, firmware and/or any combination of hardware, software and/or firmware. Thus, for example, any of the example gateway interface 302, the example rules processor 304, the example rules database 306, the example location cache 308, the example request receiver 310, the example request processor 312, the example request transmitter 314 and/or, more generally, the example DDF 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example gateway interface 302, the example rules processor 304, the example rules database 306, the example location cache 308, the example request receiver 310, the example request processor 312, and/or the example request transmitter 314 are hereby expressly defined to include a computer readable medium such as a memory, DVD, CD, etc. storing the software and/or firmware. Further still, the example DDF 130 of FIG. 3 may include one or more elements, processes and/or devices in addition to, or instead of, those illustrated in FIG. 3, and/or may include more than one of any or all of the illustrated elements, processes and devices.

Figure 4:
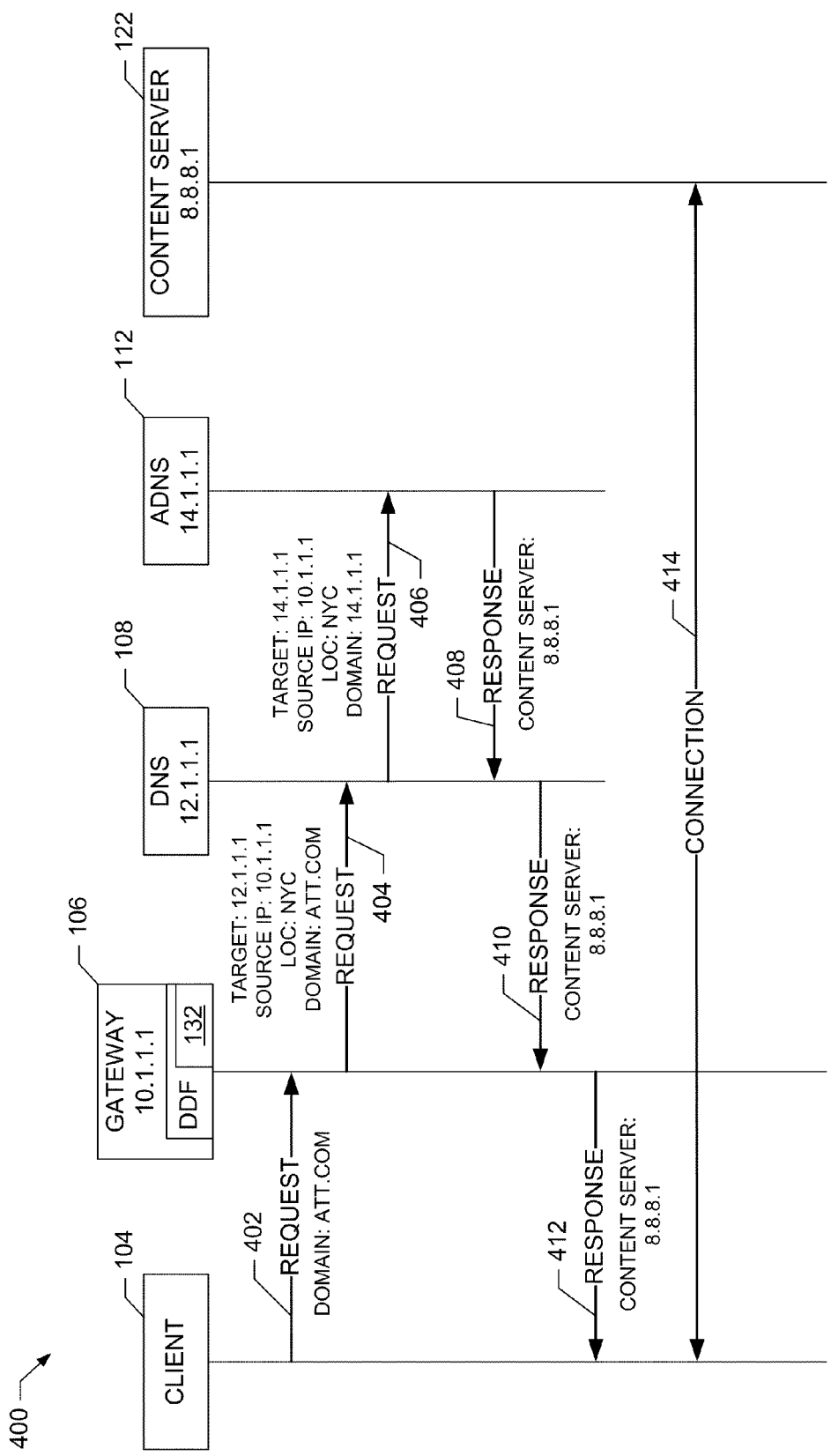
FIG. 4 shows a message diagram of a domain name request from the client of FIGS. 1 and 2.

FIG. 4 shows a message diagram 400 of a domain name request from the client 104 of FIGS. 1 and 2. The message flow diagram 400 begins when the client 104 generates and transmits a request message 402. The request message 402 is a request for a domain associated with the 'att.com' domain name. The request message 402 is received at the gateway 106, which has an assigned IP address of 10.1.1.1. The example gateway 106 forwards the request message 402 to the DDF 130, which then accesses the forwarding rule set 132 to determine which regional DNS server corresponds to the 'att.com' domain request.

In the illustrated example, the DDF 130 determines the regional DNS server 108 with an IP address of 12.1.1.1 corresponds to (e.g., is operated by) the 'att.com' domain. The DDF 130 adds this IP address within a target IP address field within a request message 404. The DDF 130 also adds the IP address of the gateway 106 into a source field within the message 404. Additionally, the DDF 130 accesses the location cache 308 for network and/or geographic location information and adds the information (e.g., LOC: NYC) to the request message 404. In this example, the location indicates that the client 104 is in New York City. The DDF 130, via the gateway, 106 then sends the request message 404 to the selected regional DNS server 108.

The example regional DNS server 108 receives the request 404 and uses at least one of the source IP address, the domain, the network, and/or the geographic location of the client 104 to select an ADNS server. In the example of FIG. 4, the regional DNS server 108 uses the location of 'NYC' to select the ADNS server 112 that is physically closest to the client 104 (e.g., the ADNS server 112 that is relatively closer to the 'NYC' area than other ADNS servers) and that is associated with (e.g., operated by) a service provider corresponding to the 'att.com' domain. In the illustrated example, the selected ADNS server 112 has an IP address of 14.1.1.1. The regional DNS server 108 replaces the target IP address of the request message 404 with the new target IP address 14.1.1.1 of the ADNS server 112.

The regional DNS server 108 also resolves (e.g., translates) the 'att.com' domain name by replacing the 'att.com' domain with the IP address of the ADNS server 112 to generate the request message 406. In this manner, the 'att.com' domain name provided by the client 104 is translated into the corresponding IP address of the ADNS server 112, which is a gateway to the 'att.com' domain. The regional DNS server 108 then transmits the request message 406 to the ADNS server 112.

The example ADNS server 112 receives the request message 406 and selects a content server based on the location of the client 104. In the illustrated example, the ADNS server 112 uses the 'NYC' location and/or the source IP address (via geographic-IP address lookup) to determine that the client 104 is located within the New York City area. The ADNS server 112 determines that the content server 122 is communicatively and/or physically closer to the 'NYC' location than other content servers (e.g., the content servers 124 and 126 of FIGS. 1 and 2). In other examples, the ADNS server 112 may select the content server 122 based upon available capacity of the content server 122 in consideration of a distance of the content server 122 from the client 104.

The example ADNS server 112 then generates a response message 408 with the IP address of the content server (e.g., 8.8.8.1) (e.g., a content IP address) and transmits the response message 408 to the regional DNS server 108. The regional DNS server 108 receives the message 408 and transmits the IP address of the content server 122 to the gateway 106 via a response message 410. The gateway 106 then generates a response message 412 with the IP address of the content server 122 and transmits the message 412 to the client 104. In some examples, the response messages 408, 410, and 412 may be the same response message.

Upon receiving the response message 412, the client 104 accesses the content server 122 by establishing a connection 414 via the gateway 106 and the switching network 102 (not shown). The connection 414 enables the client 104 to view data, download data, stream data, upload data, etc. that is included within the content server 122. Because the content server 122 is the closest content server associated with the 'att.com' domain to the client 104, the client 104 may communicate with the content server 122 relatively faster than other 'att.com' content servers. The client 104 may end the connection 414 by requesting a different domain name and/or by exiting an application (e.g., an Internet browser) maintaining the connection 414.

Figure 5A:
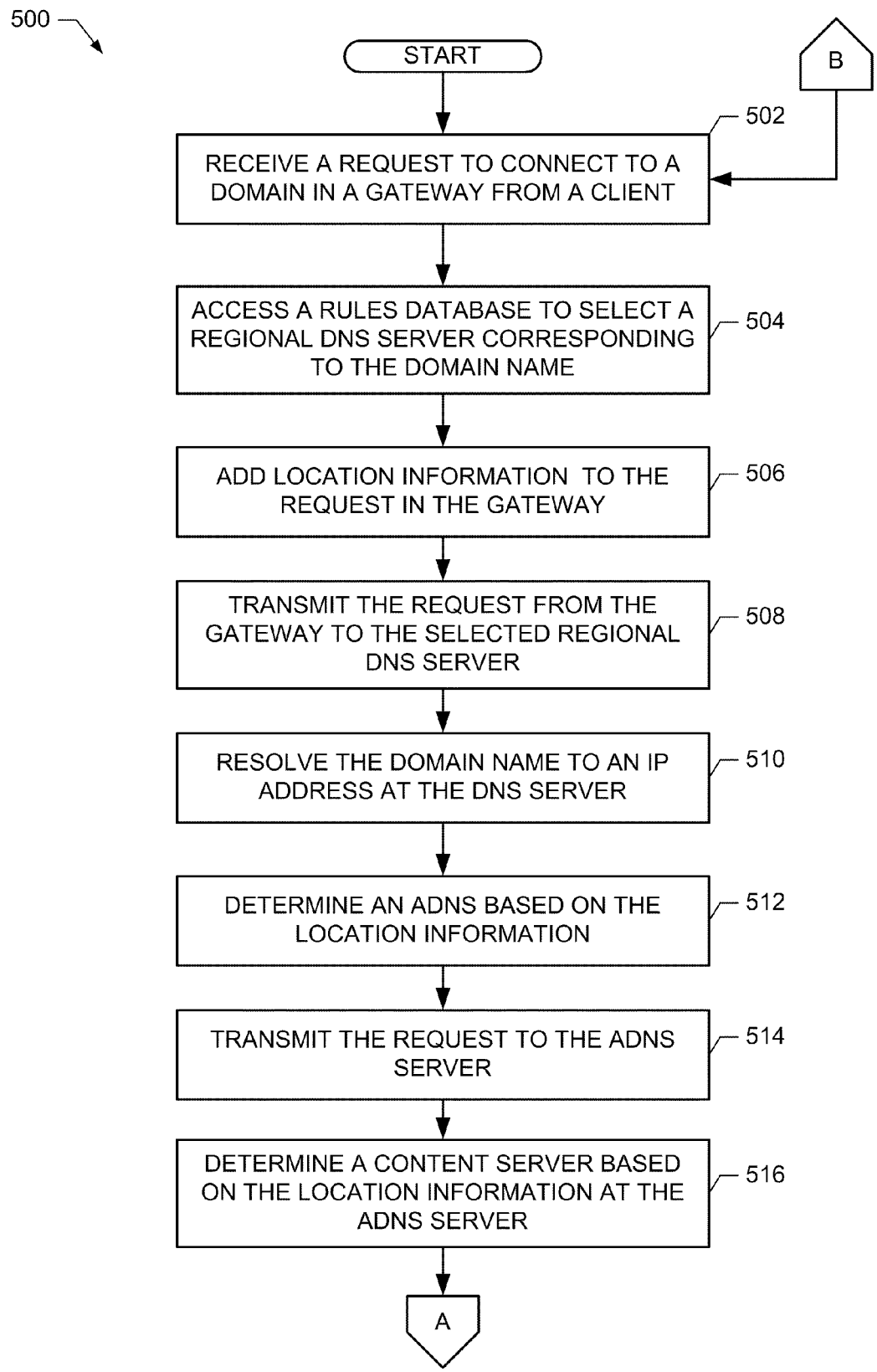
FIGS. 5A, 5B, and 6 are flowcharts representative of example machine-accessible instructions, which may be executed to implement the dynamic domain name system forwarder of FIGS. 1-4.
Figure 5B:
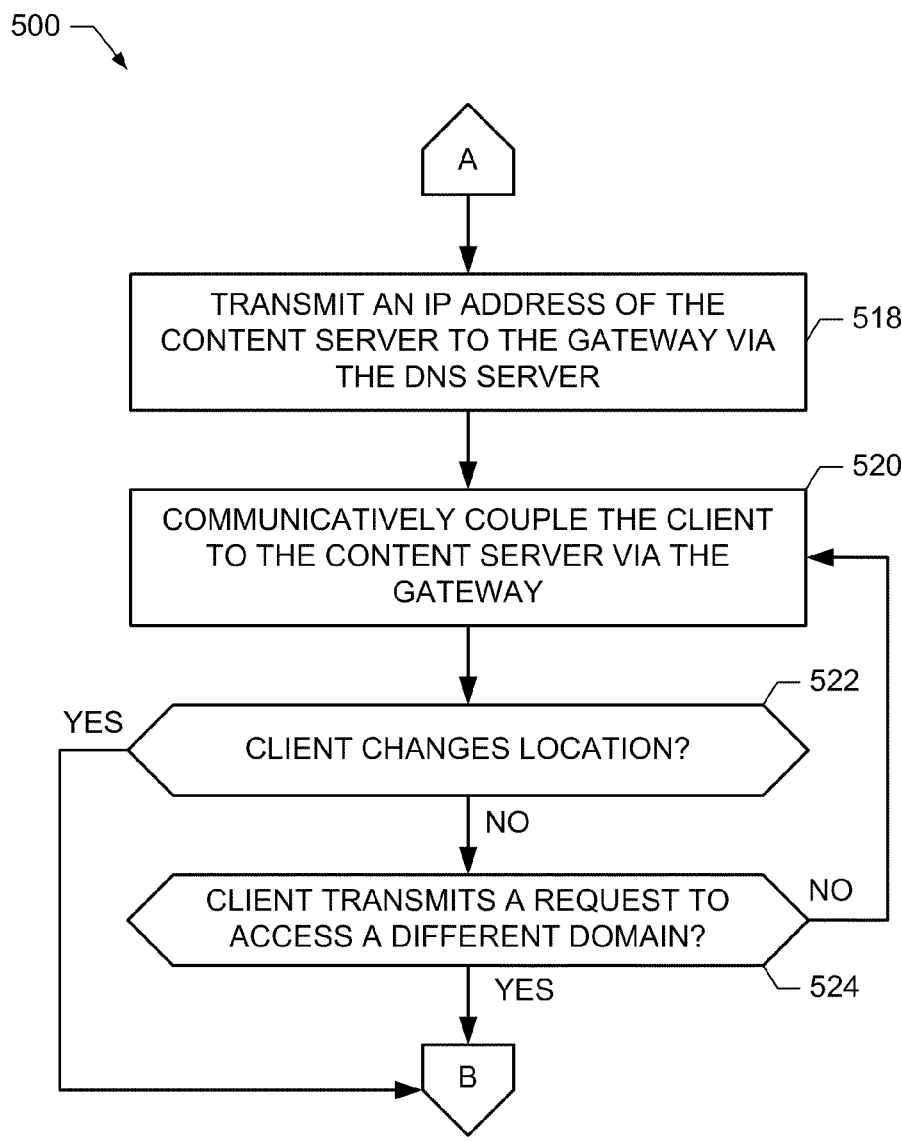
Figure 6:
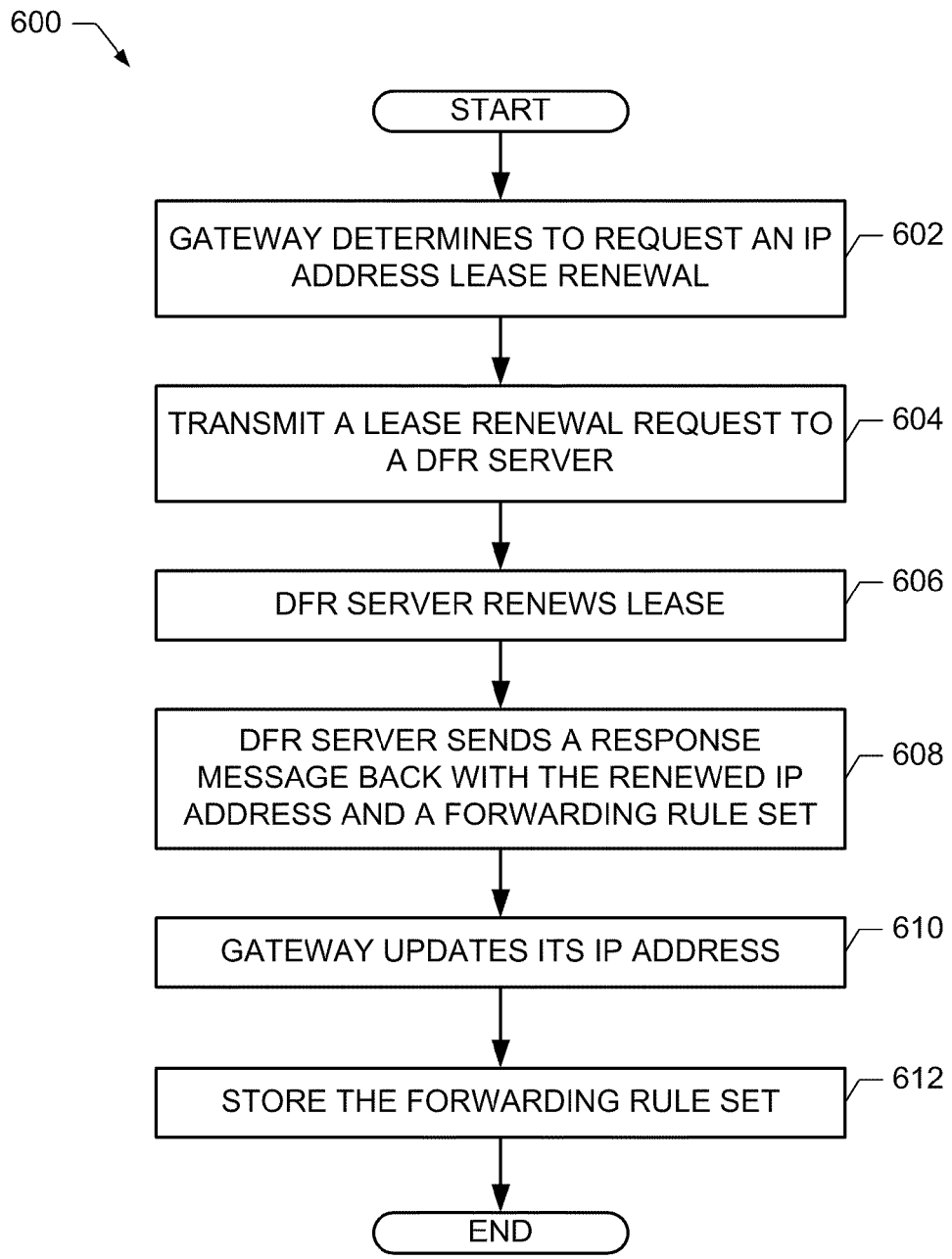

Flowcharts representative of example machine readable instructions 500 and 600 for implementing the DDF 130 of FIGS. 1-4 are shown in FIGS. 5A, 5B, and 6. In this example, the machine readable instructions comprise a program for execution by a processor such as the processor P105 shown in the example processor platform P100 discussed below in connection with FIG. 7. The program may be embodied in software stored on a computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 5A, 5B, and 6, many other methods of implementing the example DDF 130 may alternatively be used. For example, the order of execution of the blocks may be changed, and/or some of the blocks described may be changed, eliminated, or combined.

As mentioned above, the example processes of FIGS. 5A, 5B, and 6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5A, 5B, and 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

The example instructions 500 of FIG. 5A begin by receiving a domain name request to connect to a domain from the client 104 (e.g., via the request receiver 310 of FIG. 3) (block 502). The example instructions 500 then access the forwarding rule set 132 within the rules database 306 to select a regional DNS server (e.g., the regional DNS server 108) corresponding to (and/or operated by) a service provider associated with the requested domain name (e.g., via the request processor 312) (block 504). The example instructions 500 also add location information to the request for the domain (e.g., via the request processor 312) (block 506). The location information includes an IP address assigned to the gateway 106, a network location, and/or a geographic location of the client 104.

The example instructions 500 then transmit the domain name request from the gateway 106 to the selected regional DNS server (e.g., via the request transmitter 314) (block 508). The example instructions 500 resolve the domain name included within the request to a corresponding IP address (e.g., via the regional DNS server 108) (block 510). The example instructions 500 also select an ADNS server (e.g., the ADNS server 112) to forward the domain name request based on the location information (block 512) and transmit the request to the selected ADNS server (e.g., via the regional DNS server 108) (block 514). The example instructions 500 then determine a content server based on the location information (e.g., via the selected ADNS server 112) (block 516).

The example instructions 500 of FIG. 5B continue by transmitting an IP address of the selected content server (e.g., the content server 122) to the gateway 106 (e.g., via the selected ADNS server and the regional DNS server) (block 518). The example instructions 500 then communicatively couple the client 104 to the selected content server 122 (e.g., via the gateway 106) (block 520). The example instructions 500 then determine if the client 104 changes its network and/or geographic location (e.g., if the client 104 is a mobile device) (block 522). If the client 104 has changed location, the example instructions 500 of FIG. 5A process a new request to connect to the domain (e.g., via the request receiver 310) (block 502). In this instance, the client 104 may have moved closer to a different content server and the example instructions 500 determine which content server is closest to the mobile client 104.

However, if the client has not changed locations, the example instructions 500 determine if the client 104 has transmitted a request to access a different domain (e.g., via the request receiver 310) (block 524). If the client 104 has not transmitted a request to connect to a different domain, the example instructions 500 continue to maintain the connection between the client 104 and the content server 122 (block 520). Alternatively, if the client 104 has transmitted a request to connect to a different domain, the example instructions 500 of FIG. 5A receive the request (e.g., via the request receiver 310) (block 502). The example instructions 500 then determine a regional DNS server that corresponds to the newly requested domain (block 504). In other examples, the instructions 500 end (not shown) if the client 104 terminates the connection to the content server 122 without requesting to connect to a different domain.

The example instructions 600 of FIG. 6 obtain a forwarding rule set from a DFR server. The example instructions 600 begin by determining to request an IP address lease renewal (e.g., via the rules processor 304 and/or the gateway 106) (block 602). The example instructions 600 then transmit a lease renewal request to a DHCP server associated with the DFR server (e.g., the DFR server 140) (e.g., via the rules processor 304 and/or the gateway 106) (block 604). The example instructions 600 then renew the IP address lease (e.g., via the DHCP server) (block 606). In some examples, the instructions 600 may assign the gateway 106 to a different IP address.

The example instructions 600 continue by sending (e.g., via the DFR server 140) a response message to the gateway 106 with the renewed IP address and a forwarding rule set (e.g., the forwarding rule set 132) (block 608). In other examples, the example instructions 600 may request the forwarding rule set separate from the IP address renewal. The example instructions 600 then update the IP address assigned to the gateway 106 (e.g., via the rules processor 304 and/or the gateway 106) (block 610). The example instructions 600 also store the forwarding rule set to the rules database 306 (e.g., via the rules processor 304) (block 612). The example instructions 600 then terminate. In other examples, the instructions 600 request an IP address renewal after a predetermined time period has elapsed (block 602).

Figure 7:
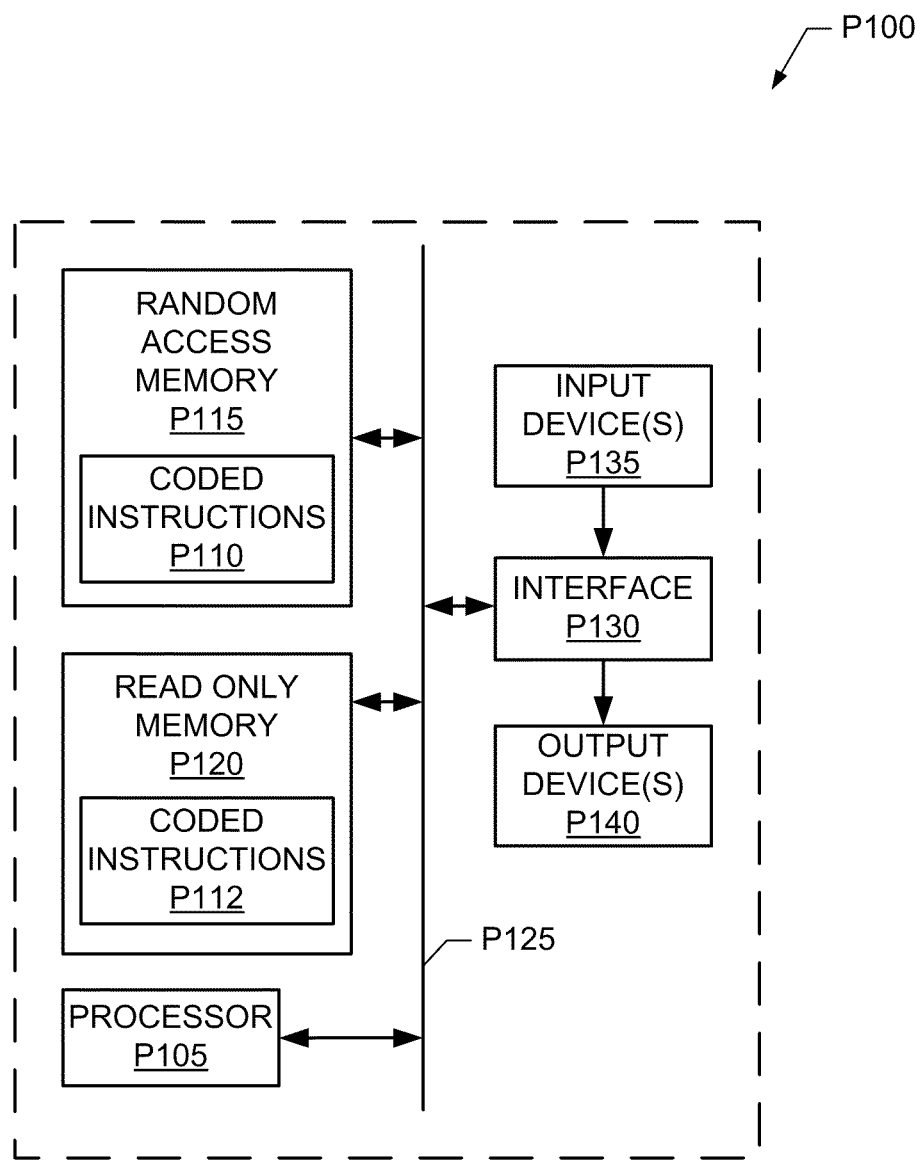
FIG. 7 is a schematic illustration of an example processor platform that may be used and/or programmed to execute the example processes and/or the example machine-accessible instructions of FIGS. 5A, 5B, and 6 to implement any or all of the example methods, apparatus and/or articles of manufacture described herein.

FIG. 7 is a schematic diagram of an example processor platform P100 that may be used and/or programmed to implement the example gateway interface 302, the example rules processor 304, the example rules database 306, the example location cache 308, the example request receiver 310, the example request processor 312, the example request transmitter 314 and/or, more generally, the example DDF 130 of FIG. 3. For example, the processor platform P100 can be implemented by one or more general-purpose processors, processor cores, microcontrollers, etc.

The processor platform P100 of the example of FIG. 7 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 5A, 5B, and/or 6 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example rules database 306 and/or the example location cache 308 of FIG. 3.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for domain name system forwarding, the method comprising:
   selecting, in a gateway, a first domain name system server corresponding to a domain name included in a domain name request received from a client in communication with the gateway, the first domain name system server being selected based on a rule indicating that domain name requests associated with the domain name are to be forwarded to the first domain name system server, the first domain name system server corresponding to a first regional domain name system server;
   adding location information to the domain name request in the gateway, the location information to be used by the first domain name system server to select a second domain name system server associated with the domain name;
   sending, from the gateway, a lease renewal request for an Internet Protocol address to a dynamic host configuration protocol server; and
   in response to the gateway sending the lease renewal request for the Internet Protocol address to the dynamic host configuration protocol server, receiving, at the gateway, a new leased Internet Protocol address and a forwarding rule set including the rule from the dynamic host configuration protocol server, the forwarding rule set specifying rules for forwarding domain name requests to regional domain name system servers based on domain names associated with the domain name requests.

2. The method as defined in claim 1, wherein the location information includes an Internet Protocol address associated with the client.

3. The method as defined in claim 1, wherein selecting the first domain name system server includes identifying the first domain name system server as being closer to the gateway than another domain name system server associated with the domain name.

4. The method as defined in claim 1, further comprising:
   receiving a content Internet Protocol address corresponding to a first content server from the second domain name system server; and
   communicatively coupling the client to the first content server using the content Internet Protocol address.

5. The method as defined in claim 1, wherein selecting the first domain name system server includes identifying the first domain name system server to have available capacity to route the domain name request to the second domain name system server.

6. The method as defined in claim 1, wherein the location information specifies a geographic location of the client.

7. An apparatus for domain name system forwarding, the apparatus comprising:
   a memory having machine readable instructions stored thereon; and
   a processor to execute the machine readable instructions to perform operations comprising:
      selecting a first domain name system server corresponding to a domain name included in a domain name request received from a client, the first domain name system server being selected based on a rule indicating that domain name requests associated with the domain name are to be forwarded to the first domain name system server, the first domain name system server corresponding to a first regional domain name system server;
      adding location information to the domain name request, the location information to be used by a second domain name system server in communication with the first domain name system server to select a content server associated with the domain name;
      sending a lease renewal request for an Internet Protocol address to a dynamic host configuration protocol server; and
      in response to sending the lease renewal request for the Internet Protocol address to the dynamic host configuration protocol server, receiving a new leased Internet Protocol address and a forwarding rule set including the rule from the dynamic host configuration protocol server, the forwarding rule set specifying rules for forwarding domain name requests to regional domain name system servers based on domain names associated with the domain name requests.

8. The apparatus as defined in claim 7, wherein the operations further comprise transmitting the domain name request including the location information to the first domain name system server.

9. The apparatus as defined in claim 7, wherein the operations further comprise:
   receiving a content Internet Protocol address corresponding to a first content server from the second domain name system server;
   communicatively coupling the client to the first content server using the content Internet Protocol address.

10. The apparatus as defined in claim 7, wherein the domain name request is a first domain name request to connect to the domain name.

11. The apparatus as defined in claim 7, wherein the operations further comprise selecting the first domain name system server by identifying the first domain name system server as being closer to the apparatus than other domain name system servers associated with the domain name.

12. A tangible computer readable storage medium comprising machine-readable instructions that, when executed, cause a machine to perform operations comprising:
   selecting a first domain name system server corresponding to a domain name included in a domain name request received from a client, the first domain name system server being selected based on a rule indicating that domain name requests associated with the domain name are to be forwarded to the first domain name system server, the first domain name system server corresponding to a first regional domain name system server;
   adding location information to the domain name request, the location information to be used by the first domain name system server to select a second domain name system server associated with the domain name;
   sending a lease renewal request for an Internet Protocol address to a dynamic host configuration protocol server; and
   in response to sending the lease renewal request for the Internet Protocol address to the dynamic host configuration protocol server, receiving a new leased Internet Protocol address and a forwarding rule set including the rule from the dynamic host configuration protocol server, the forwarding rule set specifying rules for forwarding domain name requests to regional domain name system servers based on domain names associated with the domain name requests.

13. The tangible computer readable storage medium as defined in claim 12, wherein the operations further comprise:
   receiving a content Internet Protocol address corresponding to a first content server from the second domain name system server; and
   communicatively coupling the client to the first content server using the content Internet Protocol address.

14. The tangible computer readable storage medium as defined in claim 12, wherein the location information includes an Internet Protocol address associated with the client.

15. The tangible computer readable storage medium as defined in claim 12, wherein selecting the first domain name system server includes identifying the first domain name system server as being closer to the machine than another domain name system server associated with the domain name.

16. The tangible computer readable storage medium as defined in claim 12, wherein selecting the first domain name system server includes identifying the first domain name system server to have available capacity to route the domain name request to the second domain name system server.

17. The tangible computer readable storage medium as defined in claim 12, wherein the location information specifies a geographic location of the client.

* * * * *